(12) United States Patent
Duong et al.

(10) Patent No.: US 10,233,758 B2
(45) Date of Patent: Mar. 19, 2019

(54) DETUNING TRAILING EDGE COMPOUND LEAN CONTOUR

(71) Applicant: United Technologies Corporation, Hartford, CT (US)

(72) Inventors: Loc Quang Duong, San Diego, CA (US); Xiaolan Hu, San Diego, CA (US); Gao Yang, San Diego, CA (US); Jesus A. Garcia, San Diego, CA (US); Dan G. Sapiro, Poway, CA (US)

(73) Assignee: United Technologies Corporation, Farmington, CT (US)

( * ) Notice: Subject to any disclaimer, the term of this patent is extended or adjusted under 35 U.S.C. 154(b) by 363 days.

(21) Appl. No.: 15/023,912

(22) PCT Filed: Oct. 2, 2014

(86) PCT No.: PCT/US2014/058807
§ 371 (c)(1),
(2) Date: Mar. 22, 2016

(87) PCT Pub. No.: WO2015/054023
PCT Pub. Date: Apr. 16, 2015

(65) Prior Publication Data
US 2016/0230561 A1 Aug. 11, 2016

Related U.S. Application Data

(60) Provisional application No. 61/888,192, filed on Oct. 8, 2013.

(51) Int. Cl.
*F01D 5/14* (2006.01)
*F01D 5/16* (2006.01)
*F01D 5/26* (2006.01)

(52) U.S. Cl.
CPC .............. *F01D 5/141* (2013.01); *F01D 5/14* (2013.01); *F01D 5/145* (2013.01); *F01D 5/16* (2013.01);
(Continued)

(58) Field of Classification Search
None
See application file for complete search history.

(56) References Cited

U.S. PATENT DOCUMENTS 1,469,973 A * 10/1923 Thompson .............. F01D 5/048
416/144
2,714,499 A * 8/1955 Warner ..................... F01D 5/16
416/243
(Continued)

FOREIGN PATENT DOCUMENTS

GB 768026 A 2/1957
JP 2003056304 A 2/2003
(Continued)

OTHER PUBLICATIONS

Communication Pursuant to Article 94(3) EPC for EP Application No. 14851901.0, dated Apr. 30, 2018, 5 pages.
(Continued)

*Primary Examiner* — Jason D Shanske
*Assistant Examiner* — Theodore C Ribadeneyra
(74) *Attorney, Agent, or Firm* — Kinney & Lange, P.A.

(57) ABSTRACT

A rotor blade comprises a blade platform and an airfoil. The airfoil comprises a blade tip, a leading edge, and a trailing edge with a stiffening compound lean contour. The blade tip is radially opposite the blade platform, and defines a blade span between the blade itself and the blade platform. The leading and trailing edges extend from the blade platform to the blade tip to define blade chords between the leading edge and the trailing edge. The compound lean contour comprises
(Continued)

a positive lean section located at the lean tip, and extending along a lean axis to a lean end. The negative lean section is located radially inward of the positive lean section, and extends along the lean axis to the lean end.

23 Claims, 7 Drawing Sheets (52) U.S. Cl.
CPC .......... *F01D 5/26* (2013.01); *F05D 2240/304* (2013.01); *Y02T 50/672* (2013.01); *Y02T 50/673* (2013.01)

(56) References Cited

U.S. PATENT DOCUMENTS

| | | | |
|---|---|---|---|
| 5,167,489 | A | 12/1992 | Wadia et al. |
| 6,290,465 | B1 | 9/2001 | Lammas et al. |
| 6,341,942 | B1 | 1/2002 | Chou et al. |
| 7,121,792 | B1 | 10/2006 | Fessou et al. |
| 7,806,653 | B2 | 10/2010 | Burton et al. |
| 8,167,567 | B2 | 5/2012 | Kirchner et al. |
| 8,177,496 | B2 | 5/2012 | Wilson et al. |
| 8,333,559 | B2 | 12/2012 | Bushnell |
| 8,465,426 | B2 | 6/2013 | Kirchner et al. |
| 8,684,698 | B2 | 4/2014 | Breeze-Stringfellow et al. |
| 2004/0013515 | A1 | 1/2004 | Cherry et al. |
| 2005/0036890 | A1 | 2/2005 | Tomberg et al. |
| 2008/0152504 | A1 | 6/2008 | Burton et al. |
| 2008/0213098 | A1* | 9/2008 | Neef .................. F01D 5/20 416/223 A |
| 2012/0243975 | A1 | 9/2012 | Breeze-Stringfellow et al. |
| 2013/0064639 | A1* | 3/2013 | Morris .................. F01D 5/187 415/1 |
| 2013/0224040 | A1 | 8/2013 | Straccia |
| 2013/0266451 | A1 | 10/2013 | Pesteil et al. |
| 2015/0226074 | A1 | 8/2015 | Cojande et al. |

FOREIGN PATENT DOCUMENTS

| | | |
|---|---|---|
| JP | 2003227302 A | 8/2003 |
| WO | WO2009/103528 A2 | 8/2009 |
| WO | WO2012/077580 A1 | 6/2012 |
| WO | WO2012/080669 A1 | 6/2012 |

OTHER PUBLICATIONS

International Search Report and Written Opinion from PCT Application Serial No. PCT/US202014/058807, dated Jan. 12, 2015, 13 pages.
Extended European Search Report for EP Application No. 14851901.0, dated May 18, 2017, 9 pages.

* cited by examiner

DETUNING TRAILING EDGE COMPOUND LEAN CONTOUR

BACKGROUND

The present invention relates generally to gas turbine engines, and more particularly to trailing edge contours for a turbine rotor blade.

Gas turbines compress air to high pressures using rotary compressors, inject fuel into this compressed air and ignite the resulting fuel-air mixture with combustors, and extract mechanical energy from the resulting high-temperature, high-pressure gas flow via rotary turbines. Compressors and turbines comprise a plurality of alternating stages of rotary blades and stationary vanes. Blades and vanes are airfoil components that project into engine airflow paths to impart or extract energy, or to direct airflow, respectively. Blades and vanes may be formed integrally with rotor disks or engine casings, respectively, or may be slotted, locked, or otherwise inserted into appropriate locations.

Airfoil vibration can damage components or decrease component lifetimes, reduce overall engine efficiency, and produce undesirable noise. High amplitude vibration can arise when engine order frequencies (determined by the rotational speeds of the gas turbine) coincide with airfoil natural resonance frequencies. In the past, some gas turbine engines have managed vibration using attachable dampers. Dampers may, for instance, include clips, rings, or weights designed to dissipate that vibrational energy or change the frequency characteristics of at-risk airfoils.

SUMMARY

The present invention is directed toward a rotor blade comprising a blade platform and an airfoil. The airfoil comprises a blade tip, a leading edge, and a trailing edge with a stiffening compound lean contour. The blade tip is radially opposite the blade platform, and defines a blade span between the blade itself and the blade platform. The leading and trailing edges extend from the blade platform to the blade tip to define blade chords between the leading edge and the trailing edge. The compound lean contour comprises a positive lean section located at the lean tip, and extending along a lean axis to a lean end. The negative lean section is located radially inward of the positive lean section, and extends along the lean axis to the lean end.

DETAILED DESCRIPTION

Figure 1A:
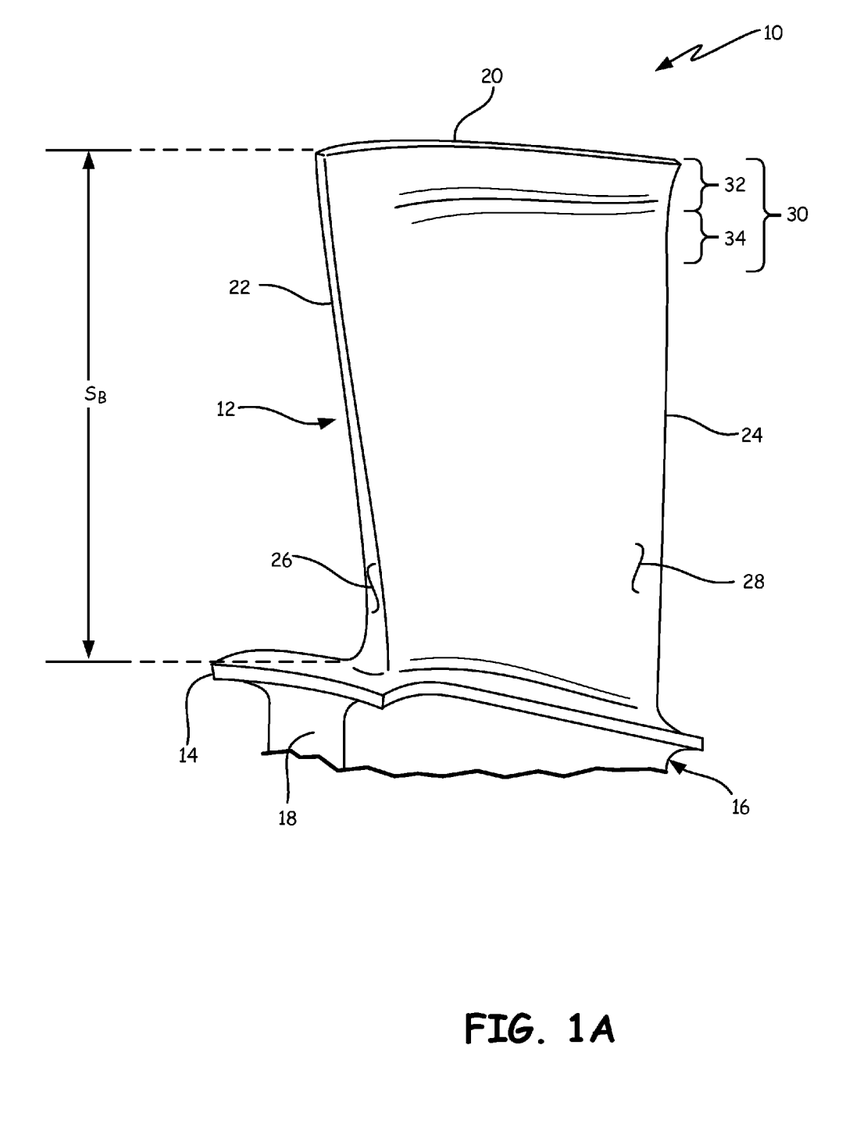
FIGS. 1a and 1b are perspective views of a rotor blade for a gas turbine engine.
Figure 1B:
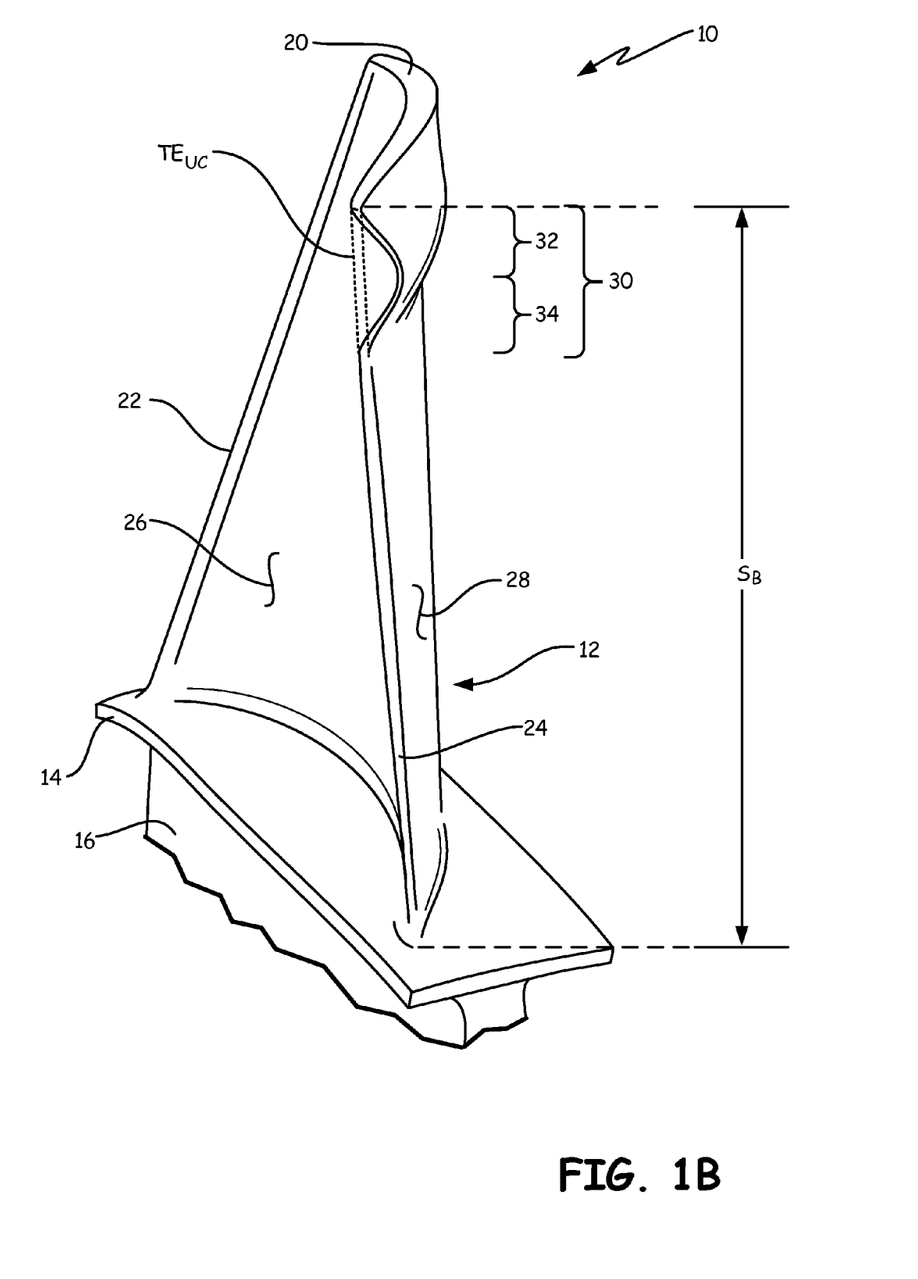

FIGS. 1a and 1b are perspective views of rotor blade 10, which comprises airfoil 12, platform 14, and blade root 16 with retention feature 18. Rotor blade 10 may, for instance, be a blade from a stage of a gas turbine engine turbine section. More generally, rotor blade/airfoil 10 may be a fan blade, a compressor blade, or a turbine blade of any stage. In some embodiments, rotor blade 10 may be a turbine blade of a turbine of a power head for an aircraft auxiliary power unit. In the depicted embodiment, airfoil 12 is one of a plurality of blade airfoils configured to be secured at root 16 in slots of a disk via retention feature 18, which may for instance be a fir-tree pattern or similar locking feature. In alternative embodiments, airfoil 12 may be an airfoil blade formed integrally as a part of a bladed rotor with a plurality of other airfoils. Platform 14 is a surface that defines an inner flow path boundary for gas flow past airfoil 12. Rotor blade 10 may for instance be formed of aluminum or composites. Some embodiments of rotor blade 10 may operate in high temperature environments (e.g. in stages of a high pressure compressor or turbine), and may accordingly be formed of high-temperature capable alloys such as waspaloy, inconel or single crystal, ceramic, or other high temperature tolerant materials.

Airfoil 12 is a substantially radial element that extends from platform 14 to blade tip 20. Airfoil 12 has leading and trailing edges 22 and 24 at its upstream and downstream ends, respectively. Airfoil 12 is characterized by blade span $S_B$, a predominantly radial distance along airfoil 12 from platform 14 to blade tip 20. Blade span $S_B$ may vary across the axial extent of rotor blade 10, depending on the shapes of blade tip 20 and platform 14. Pressure side 26 and suction side 28 are opposite surfaces of airfoil 12, each extending from leading edge 22 to trailing edge 24, and from platform 14 to blade tip 20. During gas turbine operation, rotor blade 10 rotates about a central axis such that suction side 28 faces into the ordinary direction of motion of rotor blade 10. As illustrated in FIGS. 1a and 1b, airfoil 12 may be slightly canted or angled with respect to the radial direction, and with respect to platform 14. In particular, airfoil 12 can be characterized at any axial (z) and radial (r) coordinate by a lean angle $\psi(z,r)$ expressing a degree of angular deviation at that location from a perfectly radial blade shape. By convention, $\psi=90°$ corresponds to a perfectly radial airfoil with no lean, and $\psi>90°$ is described as "positive" or "forward" lean towards the direction of rotation. Lean angle $\psi$ can vary as a function of axial and radial coordinates of airfoil 12, as described in greater detail below.

Depending on airfoil shapes and gas turbine operational parameters (see FIG. 3, below), the natural frequencies of airfoils can coincide with excitation engine order frequencies during ordinary turbine operation. Airfoil 12 includes compound lean contour 30, a stiffening contour situated at trailing edge 24, to detune the natural frequency of rotor blade 10 away from the upper bound of the operating speed range, from coincidence with engine order frequencies, and thereby prevent harmful high-amplitude vibration that would otherwise be caused by resonance within the operating speed range. Compound lean contour 30 comprises positive lean section 32 and negative lean section 34, and is described in greater detail below with respect to FIG. 2. Positive lean section 32 is a section of airfoil 12 with lean angle $\psi(z, r)>90°$ (i.e., $\psi(z, r)>90°$ for r, z within positive lean section 32). Positive lean section 32 extends radially inward from blade tip 20 and axially upstream from trailing edge 24. Negative lean section 32 extends radially inward from positive lean section 32, through a transition zone where $\psi(z, r)=90°$, and axially upstream from trailing edge 24 to displace positive lean section 32 radially so as to align blade tip 20 substantially with airfoil 12, discounting compound lean contour 30. As shown by uncontoured trailing edge illustration $TE_{UC}$ in FIG. 1b, negative lean section 32 and positive lean section 34 cooperate to situate blade tip 20 substantially in line with trailing edge 24 outside of compound lean contour 30. Uncontoured trailing edge illustration $TE_{UC}$ shows a hypothetical shape of trailing edge 24 of airfoil 12 without compound lean contour 30.

The bend or turn introduced by compound lean contour 30 increases the local bending stiffness of airfoil 12 at the tip trailing edge, and accordingly increases its natural first bending mode frequency to avoid excitation by engine order frequencies during normal turbine operation. Compound lean contour 30 tunes the first bending mode of rotor blade 10 without significantly altering natural frequencies of other modes of airfoil 12 other than the first bending mode. The increased forward lean of positive lean section 32 of compound lean contour 30 at blade tip 20 also reduces tip leakage of working fluid flow from pressure side 26 to suction side 28 during engine operation, thereby further improving engine efficiency.

Positive and negative lean sections 32 and 34 together make up compound lean contour 30, which extends only partway from trailing edge 24 to leading edge 22, and partway from blade tip 20 towards blade platform 14. In one embodiment, compound lean contour may extend in a spanwise direction from blade tip 20 across less than 20% of blade span $S_B$. In another embodiment, compound lean contour may extend in a spanwise direction from blade tip 20 across less than 40% of blade span $S_B$.

Figure 2:
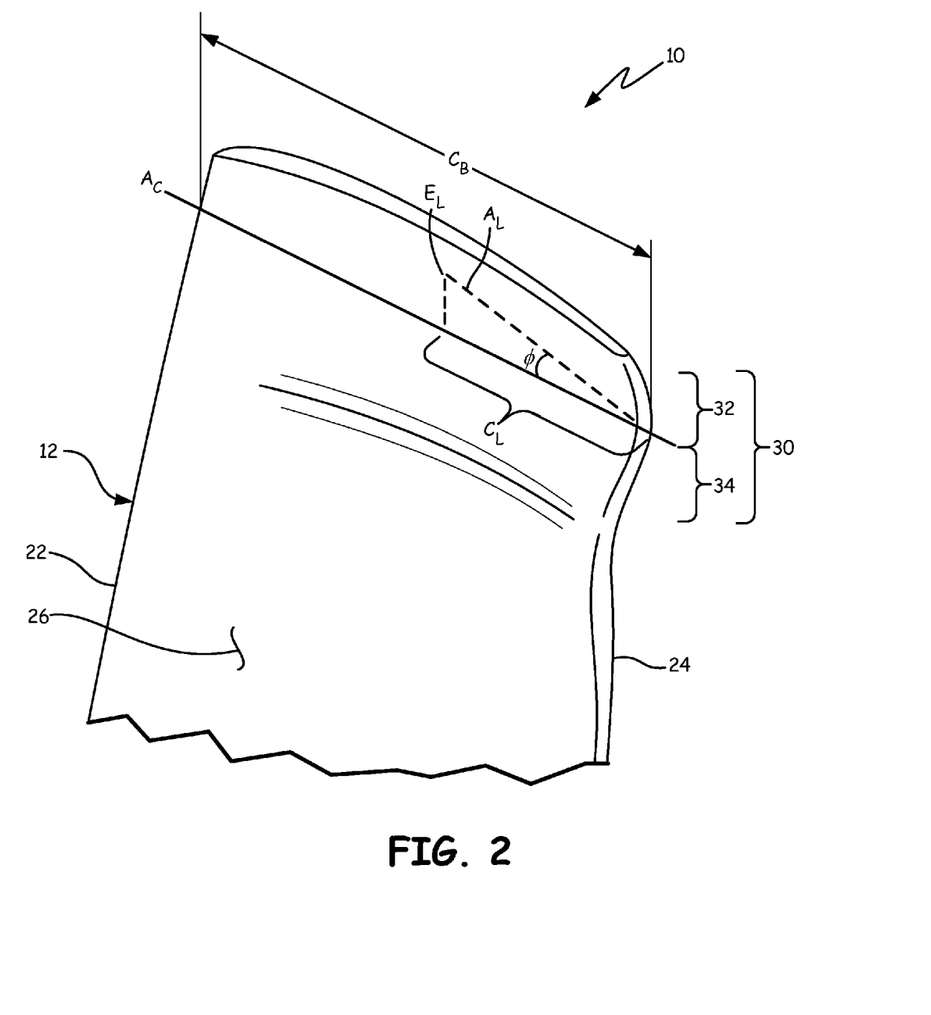
FIG. 2 is a close-up perspective view of the rotor blade of FIGS. 1a and 1b.

FIG. 2 is a close-up perspective view of airfoil 12 of rotor blade 10 near blade tip 20. FIG. 2 depicts leading and trailing edge 22 and 24, and pressure side 26 as described above with respect to FIGS. 1a and 1b. In addition, FIG. 2 illustrates lean axis $A_L$, chord axis $A_C$, blade chord $C_B$, chord lean section $C_L$, lean end $E_L$, and axis angle φ. Lean axis $A_L$ is a line separating positive lean section 32 from negative lean section 34, and is correspondingly defined such that lean angle ψ(z, r)=90° along lean axis $A_L$. Lean axis $A_L$ extends from trailing edge 24 to lean end $E_L$. Lean end $E_L$ defines the end of compound lean contour 30, such that lean angle ψ from lean end $E_L$ to leading edge 22 is substantially uncontoured. As shown in FIG. 2, lean axis $A_L$ is angled at axis angle φ with respect to chord axis $A_C$. Lean axis $A_L$ is selected to minimize the impact of compound lean contour 30 on natural frequencies of other modes of airfoil 12 other than the first bending mode. Axis angle φ indicates that lean axis $A_L$ is angled radially outward from trailing edge 24 to lead end $E_L$, and may, for instance, be between 0° and 15°. Alternatively, axis angle φ may be between 15° and 30°.

Blade chord $C_B$ is a distance from leading edge 22 to trailing edge 24 along chord axis $A_C$, a chordwise line that meets lean axis $A_L$ at trailing edge 24. Chord lean section $C_L$ is the projection of lean axis $A_L$ onto chord axis $A_C$, and reflects the chordwise extent of compound lean section 30. Lean section 30 does not extend across the full chordwise extent of airfoil 12. In some embodiments, lean section $C_L$ extends from trailing edge 24 across less than 50% of blade chord $C_B$. In some embodiments, lean section $C_L$ extends from trailing edge 24 across less than 75% of blade chord $C_B$. Within positive lean section 32, lean angle ψ(z, r) may, for instance, range from 90° (at lean axis $A_L$) to 135°. Within negative lean section 34, lean angle ψ(z, r) may, for instance, range from 90° (at lean axis $A_L$) to 45°.

Figure 3:
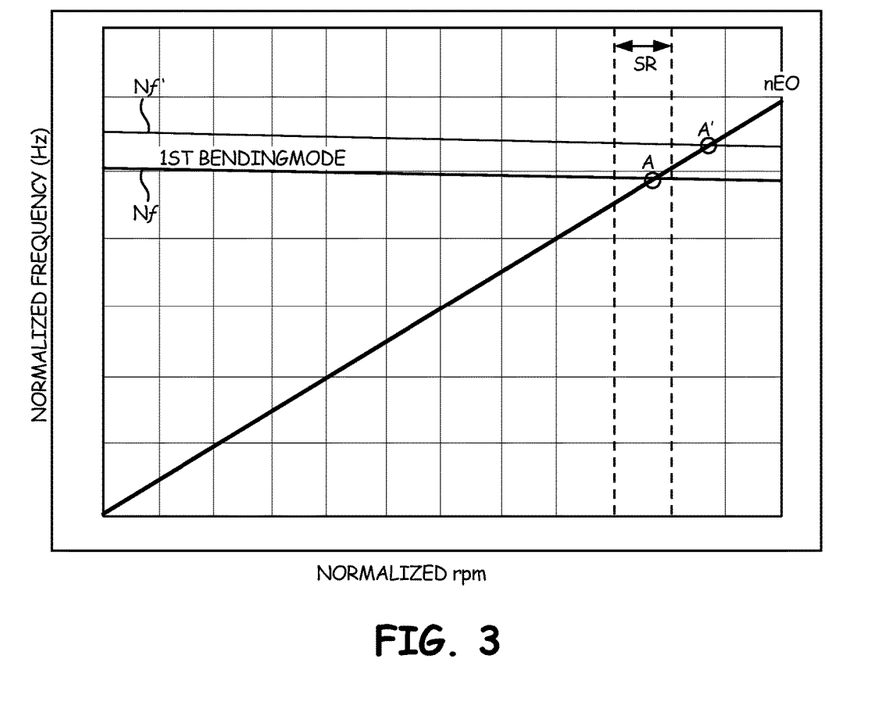
FIG. 3 is a normalized Campbell diagram illustrating the detuning effect of the rotor blade of FIGS. 1a, 1b, and 2.

FIG. 3 is a normalized Campbell diagram (normalized frequency vs. normalized engine RPM) illustrating the detuning effect of compound lean contour 30 on airfoil 12 of rotor blade 10. Engine order line nEO illustrates one set of engine order frequencies (e.g. 4th engine order) across a range of engine operating conditions. Operating speed range SR illustrates one possible operating speed range within which an uncontoured natural frequency line NF of airfoil 12 would intersect engine order line nEO at intersection A during normal operation, indicating a potentially harmful resonance condition. Compound lean contour 30 increases the first bending mode frequency of airfoil 12 by locally stiffening rotor blade 10 at the blade tip TE, shifting the natural frequency line NF of airfoil 12 to NF'. This shift causes natural frequency line NF' to intersect engine order line nEO at shifted intersection A', which falls outside of operating speed range SR. Compound lean contour 30 thus ensures that natural frequencies of airfoil 12 will not coincide with excitation engine order frequencies during ordinary operation. This detuning avoids harmful resonance conditions, thereby avoiding resonant vibration, increasing part longevity, and increasing engine efficiency. In addition, complex lean contour 30 discourages working fluid leakage from pressure side 26 to suction side 28 during operation, thereby further increasing engine efficiency.

Figure 4:
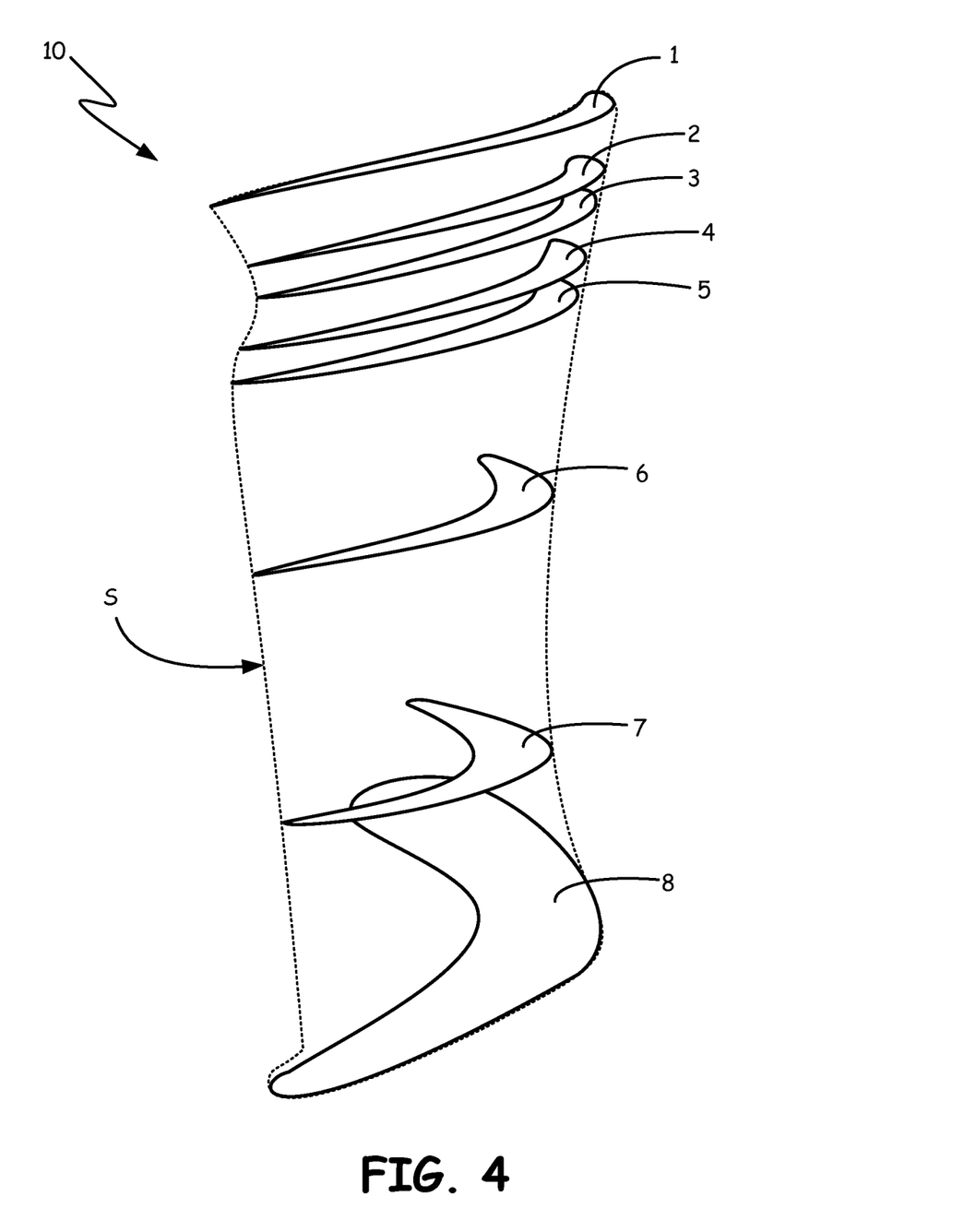
FIG. 4 is a transparent perspective view of the rotor blade of FIGS. 1a, 1b, and 2, illustrating several blade cross-sections.
Figure 5:
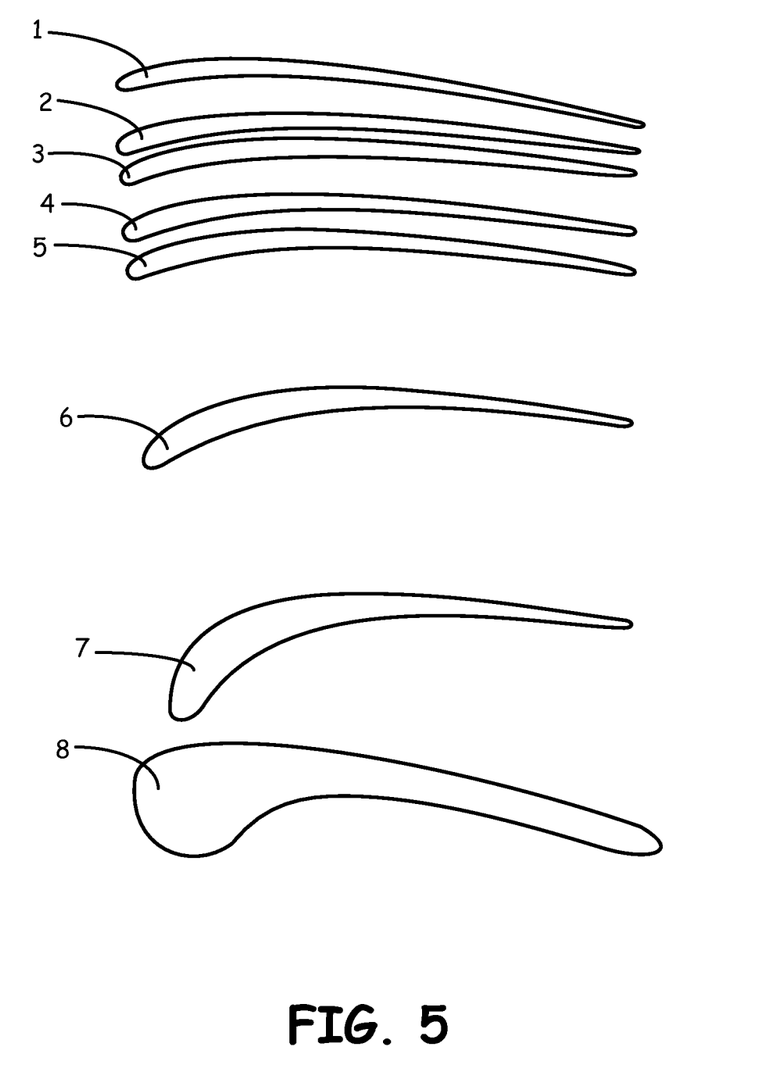
FIG. 5 is a collection of cross-sectional views of the rotor blade of FIGS. 1a, 1b, 2, and 4 through the cross-sections of FIG. 4.
Figure 6:
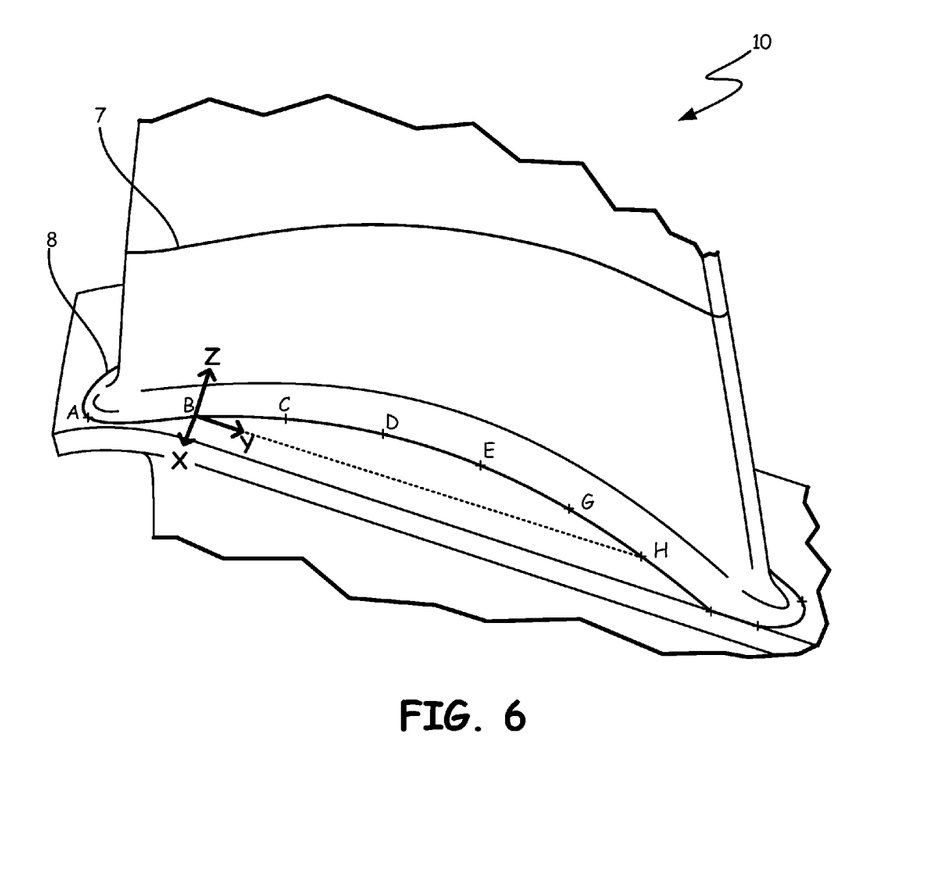
FIG. 6 is a close up view of the rotor blade of FIGS. 1a, 1b, 2, and 4 near a blade platform, illustrating two cross-sections corresponding to the cross-sectional views of FIG. 5.

FIG. 4 is a transparent perspective view of one possible embodiment of rotor blade 10 illustrating cross-sectional blade profiles 1-8. Cross-sectional blade profiles 1-8 are chordwise sections through rotor blade 10 across a range of span locations ranging from blade tip 20 to near blade root 16. Cross-sectional blade profiles 1-8 together define external surface S, which is formed by the combination of pressure side 26 and suction side 28. FIG. 5 separately illustrates cross-sectional blade profiles 1-8 from FIG. 4, arranged from blade tip 20 (section 1) to near blade root 16 (section 8). FIG. 6 illustrates rotor blade 10 at a platform location, and shows cross-sectional blade profiles 7 and 8.

Cross-sectional blade profiles 1-8 are described by coordinates set forth below in Table 1, below. Table 1 provides normalized coordinates for nineteen circumferentially/chordwise distributed points for each of cross-sectional blade profile 1-8 through one embodiment of rotor blade 10. Coordinates are provided relative to an x-y-z origin at point B of cross-sectional blade profile 8, which lies on the plane of platform 14. Coordinates are defined such that the Y-axis lies in the direction of the vector connecting point B to point H in cross-sectional blade profile 8, and accordingly lies on the plane of platform 14. The X-axis also lies on the plane of platform 14, is normal to the Y-axis, and has positive values of X increasing in the opposite direction of rotation of rotor blade 10. The Z-axis is normal to both the X-axis and the Y-axis, extends in a generally span-wise direction such that Z increases towards blade tip 20. The coordinates provided in Table 1 are normalized with respect to a maximum blade height $Z_{max}$ corresponding to the Z-distance from point B of section 8 to point I of section 1, at blade tip 20 (not shown in FIG. 6; see Table 1, below). $Z_{max}$ may, for instance, be between 0.5 inches (1.27 cm) and 3.0 inches (7.62 cm). All coordinates in Table 1 are expressed such that:

$$X_{(normalized)} = (X_{absolute})/Z_{max} \qquad \text{[Equation 1]}$$

$$Y_{(normalized)} = (Y_{absolute})/Z_{max} \qquad \text{[Equation 2]}$$

$$Z_{(normalized)} = (Z_{absolute})/Z_{max} \qquad \text{[Equation 3]}$$

Rotor blade 10 may be scaled without departing from the scope of the present invention. Some embodiments of the present invention may include fan blades and other large scale blades that are formed qualitatively as described above with respect to FIGS. 1-3, but with different coordinate geometry than that presented in Table 1, below.

Cross-sectional blade profiles 1-8 are each defined by nineteen points A-S, as described above. Between each adjacent point A-S, each section may, for instance, be defined by a substantially smooth arc. Cross-sectional blade profiles 1-8 together define the external surface of rotor blade 12, formed by pressure side 26 and suction side 28 Adjacent sections 1-8 of rotor blade 12 are connected by substantially smooth arcs to define external surface S as a smooth curve.

Novel aspects of external surface S and rotor blade 12 are achieved by substantial conformance to the geometries specified in Table 1. Substantial conformance generally includes or may include a manufacturing tolerance of about ±0.0050 inches (±0.1270 mm), in order to account for variations in molding, cutting, shaping, surface finishing and other manufacturing processes, and to accommodate variability in coating thicknesses. In one embodiment, the nominal dimensions are for a cold (i.e. room temperature) uncoated blade. This tolerance is generally constant or not scalable, unlike the geometric shape defined by cross-sectional blade profiles 1-8, as set forth in Table 1.

TABLE 1

| Section 1 | x | y | z |
|---|---|---|---|
| A | −0.3451 | −0.2670 | 0.8531 |
| B | −0.3344 | −0.1982 | 0.8745 |
| C | −0.3045 | −0.1354 | 0.8967 |
| D | −0.2624 | −0.0803 | 0.9174 |
| E | −0.2127 | −0.0298 | 0.9365 |
| F | −0.1614 | 0.0191 | 0.9541 |
| G | −0.1094 | 0.0681 | 0.9709 |
| H | −0.0574 | 0.1163 | 0.9862 |
| I | −0.0046 | 0.1653 | 1.0000 |
| J | 0.0222 | 0.2096 | 1.0122 |
| K | −0.0329 | 0.1637 | 0.9992 |
| L | −0.0880 | 0.1178 | 0.9855 |
| M | −0.1431 | 0.0719 | 0.9702 |
| N | −0.1974 | 0.0268 | 0.9533 |
| O | −0.2510 | −0.0199 | 0.9357 |
| P | −0.3007 | −0.0696 | 0.9158 |
| Q | −0.3451 | −0.1239 | 0.8944 |
| R | −0.3764 | −0.1852 | 0.8722 |
| S | −0.3826 | −0.2540 | 0.8508 |

| Section 2 | x | y | z |
|---|---|---|---|
| A | −0.3206 | −0.2533 | 0.7774 |
| B | −0.3206 | −0.1829 | 0.7972 |
| C | −0.3030 | −0.1163 | 0.8179 |
| D | −0.2708 | −0.0543 | 0.8386 |
| E | −0.2311 | 0.0031 | 0.8585 |
| F | −0.1875 | 0.0581 | 0.8783 |
| G | −0.1415 | 0.1109 | 0.8982 |
| H | −0.0941 | 0.1622 | 0.9174 |
| I | −0.0451 | 0.2127 | 0.9365 |
| J | −0.0222 | 0.2563 | 0.9510 |
| K | −0.0750 | 0.2096 | 0.9327 |
| L | −0.1262 | 0.1622 | 0.9135 |
| M | −0.1767 | 0.1132 | 0.8952 |
| N | −0.2257 | 0.0627 | 0.8761 |
| O | −0.2724 | 0.0099 | 0.8569 |
| P | −0.3129 | −0.0459 | 0.8370 |
| Q | −0.3466 | −0.1071 | 0.8164 |
| R | −0.3665 | −0.1737 | 0.7957 |
| S | −0.3604 | −0.2433 | 0.7766 |

| Section 3 | x | y | z |
|---|---|---|---|
| A | −0.3068 | −0.2456 | 0.7414 |
| B | −0.3106 | −0.1760 | 0.7605 |
| C | −0.2976 | −0.1079 | 0.7812 |
| D | −0.2686 | −0.0444 | 0.8018 |
| E | −0.2326 | 0.0145 | 0.8217 |
| F | −0.1913 | 0.0712 | 0.8416 |
| G | −0.1477 | 0.1255 | 0.8615 |
| H | −0.1018 | 0.1783 | 0.8806 |
| I | −0.0536 | 0.2288 | 0.8998 |
| J | −0.0321 | 0.2731 | 0.9143 |
| K | −0.0834 | 0.2257 | 0.8959 |
| L | −0.1347 | 0.1767 | 0.8776 |
| M | −0.1836 | 0.1270 | 0.8585 |
| N | −0.2311 | 0.0757 | 0.8393 |
| O | −0.2754 | 0.0222 | 0.8202 |
| P | −0.3137 | −0.0360 | 0.7995 |
| Q | −0.3428 | −0.0995 | 0.7789 |
| R | −0.3581 | −0.1668 | 0.7582 |
| S | −0.3481 | −0.2349 | 0.7399 |

| Section 4 | x | y | z |
|---|---|---|---|
| A | −0.2808 | −0.2326 | 0.6748 |
| B | −0.2854 | −0.1637 | 0.6947 |
| C | −0.2747 | −0.0949 | 0.7146 |
| D | −0.2479 | −0.0314 | 0.7353 |
| E | −0.2127 | 0.0283 | 0.7559 |
| F | −0.1714 | 0.0842 | 0.7758 |
| G | −0.1262 | 0.1377 | 0.7950 |
| H | −0.0788 | 0.1882 | 0.8141 |
| I | −0.0283 | 0.2372 | 0.8332 |
| J | −0.0061 | 0.2793 | 0.8470 |
| K | −0.0597 | 0.2349 | 0.8294 |
| L | −0.1125 | 0.1890 | 0.8110 |
| M | −0.1637 | 0.1415 | 0.7927 |
| N | −0.2135 | 0.0918 | 0.7735 |
| O | −0.2586 | 0.0390 | 0.7544 |
| P | −0.2961 | −0.0191 | 0.7345 |
| Q | −0.3229 | −0.0834 | 0.7138 |
| R | −0.3351 | −0.1507 | 0.6932 |
| S | −0.3236 | −0.2196 | 0.6748 |

| Section 5 | x | y | z |
|---|---|---|---|
| A | −0.2632 | −0.2242 | 0.6312 |
| B | −0.2678 | −0.1553 | 0.6503 |
| C | −0.2586 | −0.0865 | 0.6710 |
| D | −0.2326 | −0.0222 | 0.6917 |
| E | −0.1974 | 0.0375 | 0.7123 |
| F | −0.1561 | 0.0933 | 0.7322 |
| G | −0.1094 | 0.1454 | 0.7513 |
| H | −0.0597 | 0.1943 | 0.7697 |
| I | −0.0084 | 0.2418 | 0.7881 |
| J | 0.0161 | 0.2831 | 0.8026 |
| K | −0.0398 | 0.2402 | 0.7850 |
| L | −0.0941 | 0.1966 | 0.7674 |
| M | −0.1477 | 0.1507 | 0.7490 |
| N | −0.1982 | 0.1025 | 0.7307 |
| O | −0.2448 | 0.0513 | 0.7116 |
| P | −0.2831 | −0.0069 | 0.6909 |
| Q | −0.3091 | −0.0712 | 0.6702 |
| R | −0.3198 | −0.1400 | 0.6496 |
| S | −0.3068 | −0.2081 | 0.6320 |

| Section 6 | x | y | z |
|---|---|---|---|
| A | −0.1729 | −0.1806 | 0.4132 |
| B | −0.1943 | −0.1117 | 0.4308 |
| C | −0.2081 | −0.0413 | 0.4491 |
| D | −0.2058 | 0.0306 | 0.4698 |
| E | −0.1867 | 0.0987 | 0.4904 |
| F | −0.1546 | 0.1622 | 0.5119 |
| G | −0.1132 | 0.2211 | 0.5325 |
| H | −0.0658 | 0.2747 | 0.5524 |
| I | −0.0153 | 0.3252 | 0.5715 |
| J | 0.0061 | 0.3688 | 0.5861 |
| K | −0.0497 | 0.3236 | 0.5677 |
| L | −0.1041 | 0.2762 | 0.5493 |
| M | −0.1561 | 0.2272 | 0.5302 |
| N | −0.2050 | 0.1744 | 0.5103 |
| O | −0.2471 | 0.1163 | 0.4897 |
| P | −0.2731 | 0.0505 | 0.4690 |
| Q | −0.2777 | −0.0207 | 0.4484 |
| R | −0.2617 | −0.0910 | 0.4300 |
| S | −0.2280 | −0.1553 | 0.4147 |

TABLE 1-continued

| Section 7 | x | y | z |
|---|---|---|---|
| A | −0.0551 | −0.1163 | 0.1232 |
| B | −0.0849 | −0.0490 | 0.1393 |
| C | −0.1293 | 0.0176 | 0.1538 |
| D | −0.1607 | 0.0903 | 0.1714 |
| E | −0.1691 | 0.1683 | 0.1928 |
| F | −0.1538 | 0.2448 | 0.2158 |
| G | −0.1209 | 0.3160 | 0.2395 |
| H | −0.0750 | 0.3795 | 0.2617 |
| I | −0.0230 | 0.4384 | 0.2831 |
| J | −0.0008 | 0.4874 | 0.2992 |
| K | −0.0604 | 0.4361 | 0.2793 |
| L | −0.1178 | 0.3818 | 0.2578 |
| M | −0.1721 | 0.3244 | 0.2364 |
| N | −0.2196 | 0.2624 | 0.2142 |
| O | −0.2533 | 0.1920 | 0.1913 |
| P | −0.2594 | 0.1140 | 0.1683 |
| Q | −0.2326 | 0.0398 | 0.1500 |
| R | −0.1852 | −0.0245 | 0.1362 |
| S | −0.1255 | −0.0796 | 0.1262 |

| Section 8 | x | y | z |
|---|---|---|---|
| A | 0.0237 | −0.1041 | −0.0245 |
| B | 0.0000 | 0.0000 | 0.0000 |
| C | −0.0604 | 0.0857 | −0.0038 |
| D | −0.0987 | 0.1829 | −0.0061 |
| E | −0.0987 | 0.2869 | −0.0054 |
| F | −0.0627 | 0.3849 | −0.0008 |
| G | −0.0069 | 0.4736 | 0.0031 |
| H | 0.0543 | 0.5585 | 0.0046 |
| I | 0.0551 | 0.6075 | 0.0046 |
| J | −0.0237 | 0.6419 | 0.0031 |
| K | −0.0926 | 0.5738 | −0.0015 |
| L | −0.1561 | 0.5004 | −0.0084 |
| M | −0.2158 | 0.4239 | −0.0176 |
| N | −0.2647 | 0.3405 | −0.0275 |
| O | −0.2923 | 0.2479 | −0.0344 |
| P | −0.2900 | 0.1515 | −0.0360 |
| Q | −0.2555 | 0.0604 | −0.0314 |
| R | −0.2005 | −0.0184 | −0.0230 |
| S | −0.0964 | −0.0910 | −0.0245 |

DISCUSSION OF POSSIBLE EMBODIMENTS

The following are non-exclusive descriptions of possible embodiments of the present invention.

A rotor blade comprising: a blade platform; and an airfoil comprising: a blade tip radially opposite the blade platform, and defining a blade span therebetween; and leading and trailing edges extending from the blade platform to the blade tip to define blade chords between the leading edge and the trailing edge; wherein the trailing edge has a compound lean contour comprising: a positive lean section located at the blade tip, and extending along a lean axis to a lean end; a negative lean section located radially inward of the positive lean section, and extending along the lean axis to the lean end.

The rotor blade of the preceding paragraph can optionally include, additionally and/or alternatively, any one or more of the following features, configurations and/or additional components:

A further embodiment of the foregoing rotor blade, wherein the lean axis is angled radially outward from the trailing edge to the lean end, with respect to the blade chords.

A further embodiment of the foregoing rotor blade, wherein the lean axis is oriented at an angle between 0° and 15° with respect to the blade chords.

A further embodiment of the foregoing rotor blade, wherein the lean axis is oriented at an angle between 15° and 30° with respect to the blade chords.

A further embodiment of the foregoing rotor blade, wherein the compound lean contour extends in a spanwise direction from the blade tip across less than 20% of the blade span.

A further embodiment of the foregoing rotor blade, wherein the compound lean contour extends in the spanwise direction from the blade tip across less than 40% of the blade span.

A further embodiment of the foregoing rotor blade, wherein the compound lean contour extends in a chordwise direction from the trailing edge across less than 50% of the blade chord, to the lean end.

A further embodiment of the foregoing rotor blade, wherein the compound lean contour extends in the chordwise direction from the trailing edge across less than 75% of the blade chord, to the lean end.

A further embodiment of the foregoing rotor blade, wherein the compound lean contour increases the local stiffness of the rotor blade near a tip of the rotor blade trailing edge.

A further embodiment of the foregoing rotor blade, wherein the rotor blade is a turbine blade of a turbine section of a gas turbine engine.

A further embodiment of the foregoing rotor blade, wherein the increased local stiffness of the rotor blade serves to detune the rotor blade away from engine natural order frequencies.

A further embodiment of the foregoing rotor blade, wherein the turbine section is a turbine power head module of an aircraft auxiliary power unit.

A further embodiment of the foregoing rotor blade, wherein lean angle within the positive lean section is between 90° and 135°.

A further embodiment of the foregoing rotor blade, wherein lean angle within the negative lean section is between 90° and 45°.

A further embodiment of the foregoing rotor blade, wherein the rotor blade is a turbine blade or compressor blade A gas turbine engine including a turbine section that includes a plurality of alternating stages of blades and vanes, each blade comprising: a blade platform; an airfoil extending from the blade platform to a blade tip radially opposite the blade platform, thereby defining a blade span therebetween; and leading and trailing edges extending from the blade platform to the blade tip to define blade chords between the leading edge and the trailing edge; wherein the trailing edge has a stiffening compound lean contour with a positive lean section at the blade tip, and a negative lean section located radially inward of the positive lean section.

The gas turbine engine of the preceding paragraph can optionally include, additionally and/or alternatively, any one or more of the following features, configurations and/or additional components:

A further embodiment of the foregoing gas turbine engine, wherein the compound lean contour extends along a lean axis that is angled radially outwards from the trailing edge to a lean end, and that extends across less than 60% of one of the blade chords.

A further embodiment of the foregoing gas turbine engine, wherein the lean axis extends across less than 80% of one of the blade chords.

A further embodiment of the foregoing gas turbine engine, wherein the compound lean contour extends across less than 25% of the blade span.

A further embodiment of the foregoing gas turbine engine, wherein the compound lean contour extends across less than 50% of the blade span.

A further embodiment of the foregoing gas turbine engine, wherein the gas turbine engine is an aircraft auxiliary power unit, and the turbine section is a low pressure turbine of a power heat module.

An airfoil comprising an external surface formed in substantial conformance with a plurality of cross-sectional profiles of the airfoil, each of the cross-sectional profiles being defined by a plurality of points including normalized Cartesian coordinates as set forth in Table 1.

The airfoil of the preceding paragraph can optionally include, additionally and/or alternatively, any one or more of the following features, configurations and/or additional components:

A further embodiment of the foregoing airfoil, wherein substantial conformance includes manufacturing tolerances of about ±0.005 inches (±0.127 mm).

A further embodiment of the foregoing airfoil, wherein the external surface is defined such that the points and the adjacent cross-sectional profiles are connected via smooth arcs to define a smooth curve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. Although the description has focused on tuning of the first bending mode, other natural frequencies may also be tuned according to the present invention. A lean section qualitatively as described above may be used in any location where a local increase in stiffness is required. In some embodiments, a lean section may for example be located away from the tip trailing edge, such as in a mid-range of a blade trailing edge.

The invention claimed is:

1. A rotor blade comprising:
   a blade platform and
   an airfoil comprising:
      a blade tip radially opposite the blade platform, and defining a blade span therebetween; and
      leading and trailing edges extending from the blade platform to the blade tip to define blade chords between the leading edge and the trailing edge;
      wherein the trailing edge has a compound lean contour comprising:
         a positive lean section located at the blade tip, and extending along a lean axis to a lean end;
         a negative lean section located radially inward of the positive lean section, and extending along the lean axis to the lean end; and
         wherein the lean axis is angled radially outward from the trailing edge to the lean end and oriented at an angle between 0° and 30° with respect to the blade chords.

2. The rotor blade claim 1, wherein the lean axis is oriented at an angle between 0° and 15° with respect to the blade chords.

3. The rotor blade claim 1, wherein the lean axis is oriented at an angle between 15° and 30° with respect to the blade chords.

4. The rotor blade of claim 1, wherein the compound lean contour extends in the spanwise direction from the blade tip across less than 40% of the blade span.

5. The rotor blade of claim 4, wherein the compound lean contour extends in a spanwise direction from the blade tip across less than 20% of the blade span.

6. The rotor blade of claim 1, wherein the compound lean contour extends in the chordwise direction from the trailing edge across less than 75% of the blade chord, to the lean end.

7. The rotor blade of claim 6, wherein the compound lean contour extends in a chordwise direction from the trailing edge across less than 50% of the blade chord, to the lean end.

8. The rotor blade of claim 1, wherein the compound lean contour increases the local stiffness of the rotor blade near a tip of the rotor blade trailing edge.

9. The rotor blade of claim 8, wherein the rotor blade is a turbine blade of a turbine section of a gas turbine engine.

10. The rotor blade of claim 9, wherein the increased local stiffness of the rotor blade near a tip of the rotor blade trailing edge blade serves to detune a natural frequency of the rotor blade away from an excitation engine order.

11. The rotor blade of claim 9, wherein the turbine section is a low pressure turbine power head module of an aircraft auxiliary power unit.

12. The rotor blade of claim 1, wherein lean angle within the positive lean section is between 90° and 135°.

13. The rotor blade of claim 1, wherein lean angle within the negative lean section is between 90° and 45°.

14. The rotor blade of claim 1, wherein the rotor blade is a turbine blade or compressor blade.

15. A gas turbine engine including a turbine section that includes a plurality of alternating stages of blades and vanes, each blade comprising:
   a blade platform;
   an airfoil extending from the blade platform to a blade tip radially opposite the blade platform, thereby defining a blade span therebetween; and
   leading and trailing edges extending from the blade platform to the blade tip to define blade chords between the leading edge and the trailing edge;
   wherein the trailing edge has a stiffening compound lean contour with a positive lean section at the blade tip, and a negative lean section located radially inward of the positive lean section;
   wherein the lean axis is angled radially outward from the trailing edge to the lean end and oriented at an angle between 0° and 30° with respect to the blade chords.

16. The gas turbine engine of claim 15, wherein the compound lean contour extends along a lean axis that is angled radially outwards from the trailing edge to a lean end, and that extends across less than 75% of one of the blade chords.

17. The gas turbine engine of claim 16, wherein the lean axis extends across less than 50% of one of the blade chords.

18. The gas turbine engine of claim 15, wherein the compound lean contour extends across less than 40% of the blade span.

19. The gas turbine engine of claim 18, wherein the compound lean contour extends across less than 20% of the blade span.

20. The gas turbine engine of claim 15, wherein gas turbine engine is an aircraft auxiliary power unit, and the turbine section is a low pressure turbine of a power heat module.

21. An airfoil comprising:
an external surface formed in in substantial conformance with a plurality of cross-sectional profiles of the airfoil, each of the cross-sectional profiles being defined by a plurality of points including normalized Cartesian coordinates as set forth in Table 1.

22. The airfoil of claim 21, wherein substantial conformance includes manufacturing tolerances of about ±0.005 inches (±0.127 mm).

23. The airfoil of claim 21, wherein the external surface is defined such that the points and the adjacent cross-sectional profiles are connected via smooth arcs to define a smooth curve.

* * * * *